US012129704B2

(12) United States Patent
Reddmann

(10) Patent No.: US 12,129,704 B2
(45) Date of Patent: Oct. 29, 2024

(54) OPENING APPARATUS FOR A MOTOR VEHICLE DOOR ELEMENT

(71) Applicant: Kiekert AG, Heiligenhaus (DE)

(72) Inventor: Uwe Reddmann, Essen (DE)

(73) Assignee: Kiekert AG, Heiligenhaus (DE)

( * ) Notice: Subject to any disclaimer, the term of this patent is extended or adjusted under 35 U.S.C. 154(b) by 0 days.

(21) Appl. No.: 18/042,618

(22) PCT Filed: Jul. 14, 2021

(86) PCT No.: PCT/DE2021/100613

§ 371 (c)(1),
(2) Date: Feb. 24, 2023

(87) PCT Pub. No.: WO2022/057966

PCT Pub. Date: Mar. 24, 2022

(65) Prior Publication Data

US 2024/0026723 A1 Jan. 25, 2024

(30) Foreign Application Priority Data

Sep. 16, 2020 (DE) ..................... 10 2020 124 099.6

(51) Int. Cl.
*E05F 15/627* (2015.01)
*E05B 81/56* (2014.01)

(52) U.S. Cl.
CPC ............ *E05F 15/627* (2015.01); *E05B 81/56* (2013.01); *E05Y 2201/626* (2013.01); *E05Y 2900/531* (2013.01)

(58) Field of Classification Search
CPC ........ E05F 15/616; E05F 15/63; E05F 15/603
See application file for complete search history.

(56) References Cited

U.S. PATENT DOCUMENTS 10,087,671 B2 * 10/2018 Linden .................... E05B 81/56
10,829,034 B2 * 11/2020 Mori ........................ B60Q 3/76
10,876,341 B2 * 12/2020 Taylor ...................... E05F 15/41
11,199,031 B2 * 12/2021 Wirths ..................... E05B 81/04
11,697,952 B2 * 7/2023 Ottino ...................... E05F 1/105
49/139

FOREIGN PATENT DOCUMENTS

DE 102007039823 A1 2/2009
DE 102011015669 A1 10/2012
(Continued)

OTHER PUBLICATIONS

International Search Report mailed Oct. 19, 2021, for priority International Patent Application No. PCT/DE2021/100613.

*Primary Examiner* — Janet M Wilkens
*Assistant Examiner* — Susan M. Heschel
(74) *Attorney, Agent, or Firm* — Renner, Otto, Boisselle & Sklar, LLP

(57) ABSTRACT

An opening apparatus for a motor vehicle door element, comprising an electric drive, an actuator, more particularly a pusher element, acting on the door element, wherein the actuator can be adjusted by means of the electric drive and a transmission arranged between the electric drive and the actuator, such that the door element can be at least opened by means of the actuator, wherein a discontinuous transmission ratio is made possible by means of the transmission.

13 Claims, 1 Drawing Sheet

(56) References Cited

FOREIGN PATENT DOCUMENTS

| | | | |
|---|---|---|---|
| DE | 102014105443 | A1 | 11/2014 |
| DE | 102016105760 | A1 | 10/2017 |
| DE | 102017223104 | A1 | 6/2018 |
| DE | 102017124282 | A1 | 4/2019 |
| DE | 102018132665 | A1 | 6/2020 |

* cited by examiner

OPENING APPARATUS FOR A MOTOR VEHICLE DOOR ELEMENT

This application is a national phase of International Patent Application No. PCT/DE2021/100613 filed Jul. 14, 2021, which claims priority to German Patent Application No. 10 2020 124 099.6 filed Sep. 16, 2020, each of which is hereby incorporated herein by reference in its entirety.

FIELD OF DISCLOSURE

The invention relates to an opening apparatus for a motor vehicle door element, comprising an electric drive, an actuator, more particularly a pusher element, acting on the door element, wherein the actuator is adjustable by means of the electric drive and a transmission arranged between the electric drive and the actuator, such that the door element can be at least opened by means of the actuator.

BACKGROUND OF DISCLOSURE

To increase the comfort, more and more electrically assisted operating elements are integrated in today's motor vehicles. As an operating element for entering the motor vehicle, what are known as opening apparatuses are used, which provide the operator or vehicle driver with the door, such that the door only has to be gripped and completely opened. The opening apparatuses are combined solutions, since an opening apparatus is attached to an electrically actuatable locking system. If the operator approaches the motor vehicle and issues the command of door opening, the motor vehicle lock is opened electrically and the opening apparatus moves the door towards an opening gap, in the range of approximately 100 mm to 200 mm, relative to the motor vehicle body. As a result, the operator of the motor vehicle is enabled to grip and completely open the door element.

An opening apparatus of this kind is known for example from DE 10 2017 124 282 A1. In this case, the opening apparatus has an electric drive and an actuator, wherein the actuator is adjustable by means of the drive, and wherein the motor vehicle door is openable by means of the actuator. In order to be able to monitor the actuating movement, the opening apparatus further has a sensor for detecting the actuating movement, such that a continuous detection of the actuating movement is made possible. The electric drive or the drive unit is formed from an electric motor having a downstream transmission, wherein the actuator itself is driven by a rack-and-pinion drive. During the actuating movement, the sensor is in continuous operation. In contrast, if the moving door element is gripped and opened by the operator, the switching signal of the sensor is lost and the actuating means are moved back into the initial position.

A further opening apparatus is known from DE 10 2018 132 665 A1. This opening apparatus also has an electric drive and an actuator, wherein the actuator is adjustable by means of the drive and a transmission arranged between the actuator and the drive. In addition, there is the possibility that the door element can be held by means of the actuator. In order to detect a manual actuation of the door element, a force measuring device is used, which initiates a release of the actuator from the door element in the event of an increased load on the door element.

An opening apparatus comprising an electric drive and a pusher element is known from DE 10 2016 105 760 A1. A lever transmission is arranged between the electric drive and the pusher element. In this case, a transmission lever is driven via a Bowden cable, which in turn can be brought into engagement with a drive lever in a form-fitting manner. The drive lever itself is connected to the pusher element via a pin and is thus able to adjust the pusher element out of an opening of a door element. In this case, the driven pin is held in a slot guide, such that a continuous drive of the pusher element can be made possible.

The release for opening a motor vehicle door element, known from the prior art, has proven itself in principle, but reaches its limits for example when different requirements for a force to be provided are required for opening. Furthermore, it is an aim of the automotive industry to integrate more compact, structurally simpler and thus more cost-effective opening devices into the vehicles. This is where the invention comes in.

SUMMARY OF DISCLOSURE

The object of the invention is to provide an improved opening apparatus. In particular, the object of the invention is to provide an opening apparatus which can meet different load requirements with simplest structural means. The load requirements on the opening apparatuses can vary to the effect that, for example in the case of an iced door, a very much higher load acts on the opening apparatus, whereas the opening speed is of greater importance once the door has been opened.

The object is achieved by the features of independent claim 1. Advantageous embodiments of the invention are set out in the dependent claims. It should be noted that the embodiments described below are not restrictive; rather, any options for variation of the features described in the description and the dependent claims and the drawings are possible.

The object of the invention is achieved by providing an opening apparatus for a motor vehicle door element, comprising an electric drive, an actuator, more particularly a pusher element, acting on the door element, wherein the actuator is adjustable by means of the electric drive and a transmission arranged between the electric drive and the actuator, such that the door element can be at least opened by means of the actuator, wherein a discontinuous transmission ratio is made possible by means of the transmission. The design of the opening apparatus according to the invention now creates the possibility of making the opening apparatus adaptable to different load requirements, i.e. different functionalities. Different loads can occur if, for example, the opening apparatus is actuated and the door element is to be released from engagement with the door sealing rubber with an increased load due to icing.

An increased load can also occur if, for example, an operator rests against the door element. In these situations, an increased opening force must be provided in order to be able to meet the requirements of the increased resistance during opening. The invention overcomes this problem by providing a discontinuous transmission ratio in the opening apparatus. It is thus possible to start the opening process of the door element with an increased force and to end the opening into the open position of the door element, after overcoming an increased opening force, with a high actuating speed. In this case, the discontinuous transmission ratio serves to provide a high opening force in the transmission at the beginning of the opening process, and to provide a high speed at the end of the opening process, in order to transfer the door element into an open position.

An operator can now use the open position of the motor vehicle door element, and the gap between the motor vehicle door and the motor vehicle body created in the process, in order to grip the motor vehicle door element through this gap, completely or in part, in the course of the manual opening process. In this case, whether the motor vehicle door element is designed as, for example, a motor vehicle side door or tailgate is immaterial in principle. In this way, even motor vehicle door elements which are designed as sliding doors can be opened to such an extent that they can be subsequently opened completely by the manual opening process.

The motor vehicle door element is preferably a side door of a motor vehicle, which can be transferred from a closed position into an open position by means of the opening apparatus. In this case, the opening apparatus preferably interacts with an electric motor vehicle lock, such that the operator can electrically unlock the motor vehicle lock by means of, for example, a radio remote control, as a result of which the door element is freely pivotable. In this case, the opening apparatus combines the electrical opening of the lock with the opening of the door element in regions.

The electric drive is preferably a direct current motor, which interacts directly or indirectly with the transmission. It is conceivable here that, for example, a gearwheel arranged on a drive shaft of the electric motor, for example a worm gear, can be brought into engagement with a gear wheel or a toothing on the transmission. The gear wheel then likewise forms part of the transmission and can be referred to as a preliminary stage, for example. However, it is also conceivable that the transmission acting on the actuator can be actuated by means of a Bowden cable. For this purpose, for example the electric drive can be arranged at a distance from the actuator or transmission, in the motor vehicle, and drive the transmission via the Bowden cable and, for example, a gear preliminary stage.

The opening apparatus is used with an at least electrically releasable motor vehicle lock. If the operator gives the opening command, wherein for example a touch-sensitive switch is provided on the motor vehicle, or a radio remote control is actuated, a locking mechanism in the motor vehicle lock is initially electrically unlocked by means of a control unit in the motor vehicle, wherein a pawl of a locking mechanism releases the rotary latch, such that a lock striker held by the rotary latch is released. After the electrical unlocking, the door element is freely movable. After unlocking, the opening apparatus is activated and the door element is transferred by the opening apparatus from the closed position into the open position. The open position is characterized in that an opening gap is present between the door element and the vehicle body, into which an operator can grip and completely open the door element.

If the transmission has at least two levers cooperating with one another, a variant embodiment of the opening apparatus according to the invention results. Due to the transmission being made up of two levers, a transmission for the opening apparatus, and in particular for achieving a discontinuously operating transmission, can be provided with simplest structural means. The simplicity of the design of the opening apparatus according to the invention is an advantage, since the developers always striving to provide functionalities in a motor vehicle using the simplest structural means and thus cost-effectively. It is also advantageous in that the functionalities can be realized with a small number of very simple components, and thus with a low weight. In this case, two mutually cooperating levers can form different engagement conditions, and thus effective radii with respect to one another, depending on the length and arrangement, and thus provide a transmission which is structurally simple.

In one variant of the invention, the levers are pivotably accommodated in the opening apparatus. By means of a pivotable mounting of the levers, the effective radius between the levers can be adapted easily and structurally favorably to the existing space conditions in the opening apparatus. In particular, the engagement conditions during the interaction of the levers can change, which can be assisted by the pivotable mounting, as a result of which a reliable interaction between the levers can be made possible. Pivotable mountings of the levers are structurally simple to design, such that a structurally favorable and moreover cost-effective design of the transmission can be made possible. In particular in the case of interaction of a first lever with a further lever, the engagement conditions can change during the adjustment of the actuator, wherein the pivotable mounting makes it possible for a continuous engagement with favorable engagement conditions to be achieved.

In this case, it has been found to be particularly advantageous if at least one first lever is pivotably fastened to the pusher element itself. A first lever attached to the pusher element can be acted upon by a further lever, wherein the pivotable mounting of the first lever enables a reliable engagement ratio between the first lever and further levers. In particular, the arrangement and in particular the pivotable mounting of the first lever makes it possible for the engagement point on the pusher element to be varied, as a result of which favorable engagement ratios can be realized on the pusher element. In particular, a structural advantage can in turn be achieved by an arrangement of the first lever on an outer end of the pusher element. As a result of the arrangement at an outer end, in particular an outer end of the pusher element associated with the door element, only the part of the pusher element which is required for force transmission to the door element or for opening needs to be designed to be structurally high-strength.

If the opening apparatus can preferably be arranged next to or in the motor vehicle lock, it is also possible, however, to arrange the opening apparatus separately in the motor vehicle. In this case, the opening apparatus can be fastened in the moving door element, but also in the vehicle body or a stationary part of the vehicle body. A relative movement between the door element to be moved and the vehicle body can be made possible by means of the opening apparatus, such that the door element can be transferred into an open position.

A further embodiment of the invention results when at least one further lever can be brought into engagement with the first lever, in particular for transmitting a torque. A first lever is pivotably attached to the pusher element. A further second lever can be arranged at a distance from the actuator, such that a lever mechanism or a transmission formed of levers can be realized for actuating the actuator. If the second or further lever is now driven for example by means of a Bowden cable, the second lever thus pivots and can introduce a force into the first lever during the pivoting movement. In this case, the second lever is in engagement with the first lever via a predefinable effective radius, as a result of which the available force for opening can be adjusted. Depending on the dimensions of the door element, different forces may be required for opening in particular in extreme situations. An extreme situation occurs for example when the door element cannot be opened unhindered due to the weather conditions. In this case, the effective radius between the first and second lever elements brings about an opening with high force but low speed.

If, as is possible in a further variant of the invention, the levers can be brought into engagement with one another in such a way that at least two, preferably more than two, effective radii can be provided in the transmission, on the one hand a high force can be transmitted, and on the other hand a high opening speed can be transmitted to the door element. Due to the engagement ratios between the levers, different effective radii can act between the levers, such that on the one hand a high force, and on the other hand a high speed in the transmission, can be realized.

In this case, the effective radii can be formed at a distance from one another, on the levers. The effective radii are spaced apart from one another in such a way that, during the release of the door element from the sealing rubber the door element can be acted upon with increased force, and only when the door element has been adjusted out of the engagement with the door sealing rubber with sufficient certainty can a further effective radius in the lever mechanism be brought into engagement. As a result of the design according to the invention, a continuous opening is possible, wherein it is possible for different torques to be set in the transmission by the spacing of the effective radii and in particular the engagement regions of the effective radii between the levers. In an advantageous manner and in one variant, a first effective radius can be approximately 20 mm to 25 mm, preferably 22.5 mm, while a second effective radius between 40 mm and 50 mm, preferably 45 mm, have been found to be preferred embodiments.

It can also be advantageous and a further variant of the invention if a form-fitting interlocking of the levers can be made possible by means of the engagement regions. In this case, the engagement regions are designed in such a way that a continuous and form-fitting interlocking of the levers can be realized. Thus, although an opening of the door element that varies in speed can be realized, the door element is not stopped during the opening movement. The actuator is opened continuously but at different speeds. Preferably, the engagement regions are designed such that a rolling of the interlocking levers in the region of the engagement is made possible. For this purpose, depressions can be formed in the first lever, for example, which interact with elevations on the second or further lever.

As a result of the type of the design of the engagement regions, a quiet but continuous opening can thus be made possible. In this case, initially a first engagement region rolls in the first effective radius, which allows an opening which is slow but is provided with a high torque, in turn rolling between the first and second levers being able to be realized when the engagement of the second effective radius is reached, but a higher opening speed can be achieved here, at a lower force, due to the higher lever ratio of the second effective radius. Even if two depressions in the first lever and two elevations in the second lever are shown in this embodiment which is shown by way of example, this is naturally not meant to be limiting, but is merely intended to represent one embodiment. Of course, elevations and depressions can be arranged on both levers, which interlock in a form-fitting manner; it is likewise possible that more than two, i.e. three or four, mutually spaced engagement regions may be formed between the levers.

According to the invention, an advantage is achieved if the opening apparatus is arranged together with an electrically releasable lock in the motor vehicle. Of course, it is also conceivable that a mechanically releasable lock interacts with an opening apparatus, such that a mechanical opening can be combined with a deployment. By means of the opening apparatus according to the invention, it is now possible, using the simplest structural means, to meet different load requirements, which enables reliable opening of a door element, even in extreme situations.

BRIEF DESCRIPTION OF DRAWINGS

The invention is explained in more detail below with reference to the attached drawings on the basis of a preferred embodiment. However, the principle applies that the embodiment does not limit the invention, but is merely an advantageous embodiment. The features shown can be implemented individually or in combination with further features of the description as well as the claims—individually or in combination.

In the drawings.

DETAILED DESCRIPTION

Figure 1:
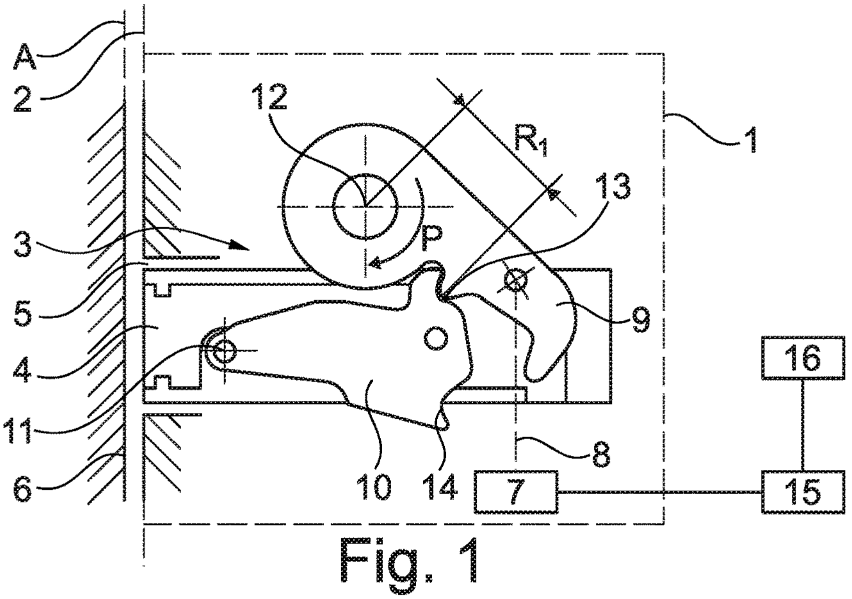
FIG. 1 is a schematic illustration of an embodiment in a side view, wherein only the components essential for explaining the invention are shown, and wherein the initial position of the opening apparatus are shown.

FIG. 1 is a schematic illustration of an opening apparatus 1 installed in a car body 2 of a motor vehicle, in a side view of the transmission 3 and the actuator 4. The opening apparatus 1 is shown in the initial position, wherein the actuator 4 ends flush with an opening 5 in the vehicle body 2. A motor vehicle door element 6 is in a closed position in which the door element 6 is, for example, held in the main latching position by an electrically actuated closing system. The opening apparatus 1 also has an electric drive 7, which, for example, engages with the transmission 3 via a Bowden cable 8. In turn, the transmission 3 in this embodiment is formed by two levers 9, 10, wherein a first lever 10 is pivotally accommodated in the actuator 4, and a second lever 9 is pivotally accommodated in the opening apparatus 1. In this case, the first lever 10 is fastened in the opening apparatus 1 so as to be pivotable about a pivot axis 11, and the second lever 9 is fastened therein so as to be pivotable about the pivot axis 12.

Two engagement regions 13, 14 are formed between the first and second levers 9, 10, which regions are each formed with a corresponding effective radius R1, R2 in the transmission 3.

FIG. 1 shows the initial position A of the door element 6 in which the door element 6 is in the closed position. The actuator 4 is held, for example, in a spring-loaded manner in the initial position, i.e. flush with the opening 5 in the opening apparatus 1. If a control signal is now transmitted to the control unit 15 by the operator, a control signal is initially sent to an electric lock 16, wherein the electric lock is unlocked. The control unit 15 then initiates the opening process. For this purpose, the control unit 15 actuates the electric drive, whereby the second lever 9 is moved in the direction of the arrow P, for example, with the aid of the Bowden cable 8. As shown in FIG. 1, the second lever 9 rests against the first lever 10 in the engagement region 13 and rolls in the engagement region 13 with the effective radius R1.

Figure 2:
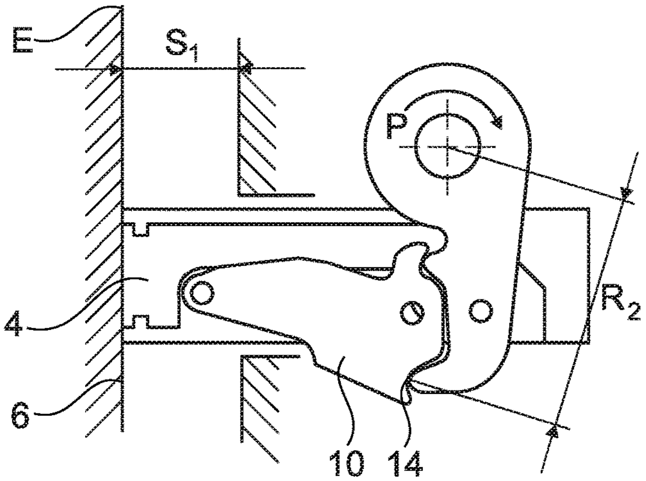
FIG. 2 shows the opening apparatus in a position in which the first effective radius has enabled ice breaking, and a partially opened door element is shown.

The transmission ratio means that a large force is exerted on the actuator 4, such that the actuator 4 can also break up ice, i.e. an iced door seal. If the door element 6 has been opened enough for a release from the door seal to have been definitely achieved, the door element 6 is then in the ice-breaking position shown in FIG. 2. The door element 6 is already open across a gap S1. When the ice-breaking position E is reached, the second effective radius R2 then engages the first lever 10 in the engagement region 14, wherein a larger effective radius R2 comes into engagement with the first lever 10. In this case, the transmission ratio changes in such a way that opening can take place at an increased speed.

Figure 3:
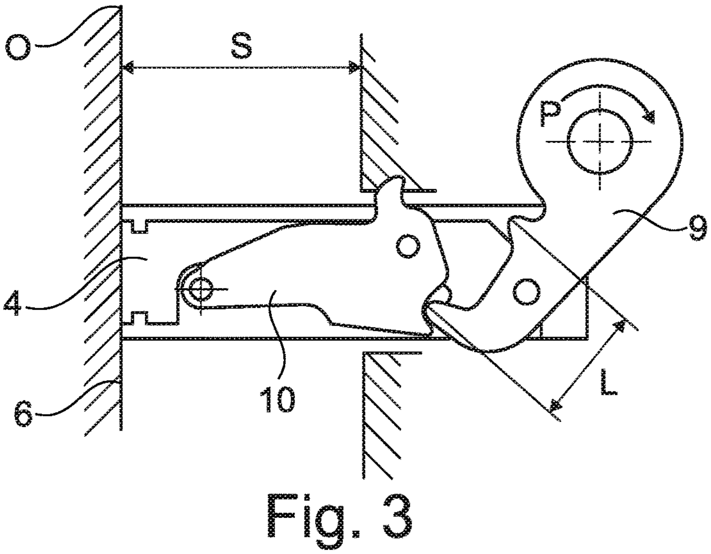
FIG. 3 shows the opening apparatus in a position in which the door element has been transferred into its open position, and the second effective radius acts on the actuator and holds the door element in the open position.

After a further actuation of the second lever 9, the open position O of the door element 6 shown in FIG. 3 is reached. As can be clearly seen in FIG. 3, the larger effective radius R2 now acts on the first lever 10, allowing the door element 6 to be opened quickly. On account of the spacing L of the engagement regions 13, 14, a discontinuous transmission ratio can be realized in the opening apparatus. A continuous partial having different functionalities can thus be realized with the simplest structural means. In this case, the spacing L of the engagement regions 13, 14 can be selected in such a way that, depending on the available or required force input, an optimized force curve can be realized in the opening apparatus 1. It has proven advantageous in this case if the ratio of the effective radii to one another is R1:R2=1:2. After the door element has been opened, the opening apparatus 1 can move the actuator 4 back into the initial position, for example by means of a spring element. However, it is also conceivable that the actuator 4 is moved back into the initial position, when the door element 6 is closed, by means of the door element 6 itself.

LIST OF REFERENCE SIGNS

1 opening apparatus
2 vehicle body
3 transmission
4 actuator
5 opening
6 motor vehicle door element
7 electric drive
8 Bowden cable
9, 10 lever
11, 12 pivot axis
13, 14 engagement region
15 control unit
16 electric lock
R, R1 effective radius
A initial position
E ice-breaking position
O open position
P arrow
S1, S gap
L spacing

The invention claimed is:

1. An opening apparatus for a motor vehicle door element, comprising:

an electric drive, an actuator that includes a pusher element that acts on the door element, wherein the actuator is adjustable by the electric drive, and a transmission arranged between the electric drive and the actuator, such that the door element is at least opened by the actuator, wherein the transmission is configured to cause a varied transmission ratio of movement of the electric drive to movement of the actuator driven by the transmission, wherein the transmission has at least two mutually cooperating levers that engage one another in at least a first engagement region and a second engagement region, and wherein the transmission ratio is a function of a spacing between the first engagement region and the second engagement region.

2. The opening apparatus according to claim 1, wherein the at least two mutually cooperating levers are pivotably accommodated in the opening apparatus.

3. The opening apparatus according to claim 1, wherein a first lever of the at least two mutually cooperating levers is pivotably attached to the pusher element.

4. The opening apparatus according to claim 3, wherein at least one further lever of the at least two mutually cooperating levers is engageable with the first lever for transmitting a torque to the first lever.

5. The opening apparatus according to claim 1, wherein the at least two mutually cooperating levers are brought into engagement with one another such that at least two effective radii are provided in the transmission.

6. The opening apparatus according to claim 5, wherein the at least two effective radii are in the different engagement regions of the at least two mutually cooperating levers and are spaced apart from one another at the at least two mutually cooperating levers.

7. The opening apparatus according to claim 6, wherein the at least two mutually cooperating levers engage with each other in a form-fitting mutual engagement in the engagement regions.

8. The opening apparatus according to claim 6, wherein the at least two mutually cooperating levers are configured for rolling off of the engagement regions.

9. The opening apparatus according to claim 1, further comprising an electric lock, wherein the opening apparatus interacts with the electric lock.

10. The opening apparatus of claim 1, wherein the transmission includes at least one of a gear wheel and a Bowden cable.

11. The opening apparatus according to claim 3, wherein the first lever is pivotably attached to an outer end of the pusher element.

12. The opening apparatus according to claim 5, wherein a first effective radius corresponds to a force transmission ratio higher than a force transmission ratio that corresponds to a second effective radius, and wherein the second effective radius corresponds to a speed transmission ratio higher than a speed transmission ratio that corresponds to the first effective radius.

13. The opening apparatus according to claim 12, wherein a ratio of the first effective radius to the second effective radius is 1:2.

* * * * *